United States Patent [19]

Okitomo et al.

[11] Patent Number: 4,719,578
[45] Date of Patent: Jan. 12, 1988

[54] PROFILING CONTROL APPARATUS AND CONTROL METHOD THEREOF

[75] Inventors: Hironari Okitomo; Masaki Nishioka; Kensuke Ide; Hirofumi Yoshikawa; Yuso Matsunaga, all of Hiroshima, Japan

[73] Assignee: Mitsubishi Jukogyo Kabushiki Kaisha, Japan

[21] Appl. No.: 806,791

[22] Filed: Dec. 9, 1985

[51] Int. Cl.$^4$ ............................................. G06F 15/46
[52] U.S. Cl. ..................................... 364/474; 318/578
[58] Field of Search ................. 364/167–171, 364/474, 475, 520, 560–563; 318/578, 571; 33/503, 504, 505; 409/67, 79, 80, 98, 121, 124, 126, 127

[56] References Cited

U.S. PATENT DOCUMENTS

| | | | |
|---|---|---|---|
| 3,292,495 | 12/1966 | Hill et al. | 364/174 X |
| 4,357,664 | 11/1982 | Imazeki et al. | 364/474 |
| 4,394,608 | 7/1983 | Tryber et al. | 364/474 X |
| 4,406,068 | 9/1983 | Tomita et al. | 33/503 |
| 4,603,487 | 8/1986 | Matsunata | 33/503 X |
| 4,630,215 | 12/1986 | Graham, Jr. | 318/578 X |

Primary Examiner—Joseph Ruggiero
Attorney, Agent, or Firm—Toren, McGeady & Associates

[57] ABSTRACT

An improved profiling control apparatus controls a profiling machine so that the apparatus judges whether an exact profiling operation is performed by the machine at a place where a surface shape of the model to be profiled is suddenly changed, for example at a step, without jumping of a stylus from the model surface, and the profiling machine performs the exact profiling operation without jumping of the stylus. The profiling control apparatus, which detects a displacement of the stylus pressed on the model surface from a tracer head and controls the profiling machine in accordance with the displacement detection signal, includes a displacement compounding unit for compounding three dimensional displacement signal $\epsilon x$, $\epsilon y$ and $\epsilon z$ to produce a displacement signal $\epsilon(=\sqrt{\epsilon x^2 + \epsilon y^2 + \epsilon z^2})$, a displacement differentiating unit for differentiating the displacement signal to produce a differentiated value $d^2\epsilon/dt^2$, a comparison voltage producing unit for producing a comparison voltage Vc corresponding to a maximum acceleration $\beta$max of the pressed stylus which can be produced thereon, and a comparison unit for comparing the comparison voltage Vc with the differentiated value $d^2\epsilon/dt^2$ to produce a jumping detection signal when $d^2\epsilon/dt^2 = Vc$. The profiling control unit is particularly suitable for profiling the model surface of which a shape is suddenly changed.

4 Claims, 24 Drawing Figures

PROFILING CONTROL APPARATUS AND CONTROL METHOD THEREOF

BACKGROUND OF THE INVENTION (i) Field of the Invention

The present invention relates to a profiling control apparatus for controlling the profiling operation of a profiling machine without jumping of a stylus of a tracer head at a place where a surface shape of a model to be profiled is suddenly changed, and controlling a profiling speed of the profiling machine and a control method thereof.

(ii) Prior Art Statement

Figure 1:
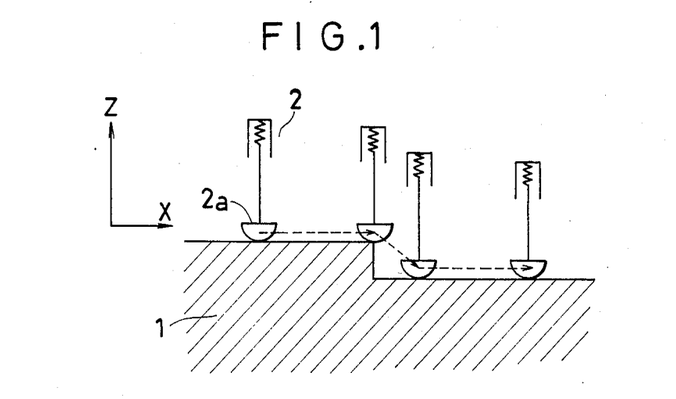
FIG. 1 schematically illustrates a stylus jumping or floating from a model surface.

A profiling apparatus in the prior art includes a stylus 2a coupled with a tracer head 2 and pressed on a surface of a model 1 to be profiled as shown in FIG. 1, and the stylus 2a is adapted to profile or move along the surface of the model 1 with the movement of the tracer head 2. However, at a place where the surface shape of the model 1 is suddenly changed, for example at a step, when the tracer head 2 moves at a high speed, the stylus 2a can not follow the surface shape of the model 1 and accordingly jumps or floats from the surface of the model 1.

Such a jumping phenomenon of the stylus results in that the stylus 1 does not exactly profile or move along the surface of the model 1. Accordingly, it is required to perform the profiling operation along the surface of the model again with a reduced moving speed of the tracer head 2. However, there is no method of judging whether the jumping phenomenon has occurred or not heretofore.

Further, when the profiling speed is high, the jumping phenomenon of the stylus 2a occurs and hence it is difficult to exactly perform the profiling operation along the shape of the model.

Figure 2:
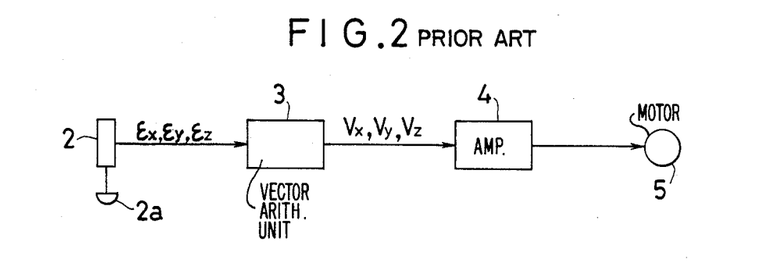
FIG. 2 is a block diagram of a prior art controller.

FIG. 2 is a block diagram showing an example of a prior art profiling control apparatus. In FIG. 2, numeral 2a denotes a stylus, numeral 2 denotes a tracer head which detects displacement signals $\epsilon x$, $\epsilon y$ and $\epsilon z$ of the stylus 2, numeral 3 denotes a vector arithmetic unit which calculates a profiling speed vector V on the basis of the displacement signals $\epsilon x$, $\epsilon y$ and $\epsilon z$ of the stylus 2a and an established profiling velocity $V_T$ and produces the profiling speed vector V, and numeral 4 denotes an amplifier which amplifies component Vx, Vy and Vz of the vector V, respectively, and drives a motor 5 for each shaft.

Figure 3:
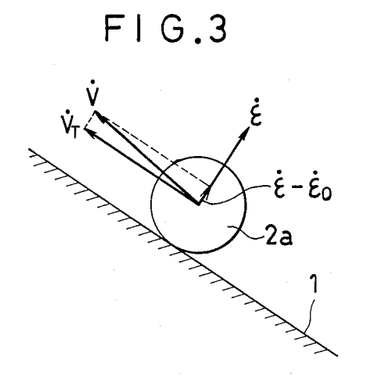
FIG. 3 schematically illustrates a calculation of a profiling speed.
Figure 4:
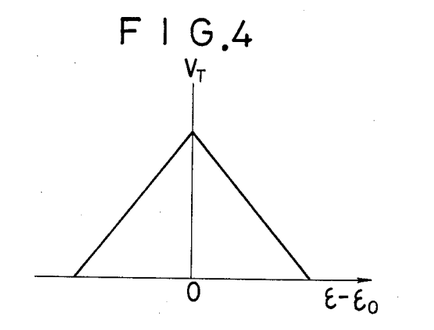
FIG. 4 is a characteristic diagram illustrating the profiling speed in a prior art.

Operation of the apparatus in FIG. 2 is now described with reference to FIGS. 3 and 4. The displacement signals $\epsilon x$, $\epsilon y$ and $\epsilon z$ of the stylus 2a which follows the surface of the model 1 shown in FIG. 3, are applied to the vector arithmetic unit 3 through the tracer head 2. The vector arithmetic unit 3 calculates compound displacements $\dot\epsilon$ and $|\epsilon| = \sqrt{\epsilon x^2 + \epsilon y^2 + \epsilon z^2}$ of the displacement signals $\epsilon x$, $\epsilon y$ and $\epsilon z$ to obtain a difference signal $\dot\epsilon - \dot\epsilon_o$ between a given reference displacement $\dot\epsilon_o$ and the compound displacement and produces a preset profiling velocity $V_T$ in a direction parallel with the surface of the model 1 perpendicular to the direction of the vector $\dot\epsilon$ perpendicular to the surface of the model 1, to compound the signal $\dot\epsilon - \dot\epsilon_o$ and the velocity $V_T$ vectorially to obtain an actual profiling vector V. The vector arithmetic unit 3 produces components Vx, Vy and Vz of the vector, V which are amplified by the amplifiers 4 and control each shaft of the drive motors 5.

Such a profiling control apparatus can not control the profiling operation to follow the surface of the model at a place where the surface shape of the model 1 is suddenly changed. Accordingly, the fact that the signal $\epsilon - \epsilon_o$ is increased at the suddenly changing portion, is utilized to produce a profiling setting velocity $V_T$ of the vector arithmetic unit 3 inversely proportional to the signal $\epsilon - \epsilon_o$ as shown in FIG. 4, so that the profiling velocity at the suddenly changing place of the surface shape of the model is reduced.

While the sudden variation of the displacement is detected to reduce the profiling velocity in this way in the above prior art apparatus, since the profiling velocity is reduced at the suddenly changing place of the surface shape of the model, it is too late due to influence of vibration or delayed response of a servo system in order to perform the exact profiling operation. Accordingly, it is impossible to establish largely a maximum value of the set velocity $V_T$ of the vector arithmetic unit (apex velocity of FIG. 4). Consequently, it is disadvantageous that the profiling velocity is suppressed to a low velocity as a whole. That is, the profiling time is made longer.

Figure 5:
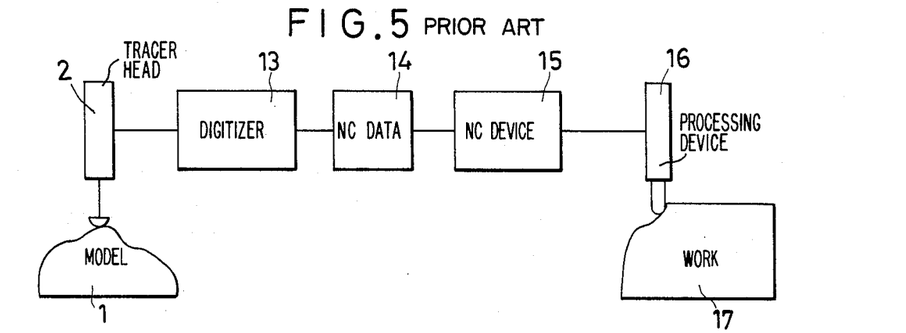
FIG. 5 is a block diagram of a prior art profiling control apparatus.

FIG. 5 is a block diagram showing a profiling control apparatus of a prior art. In FIG. 5, a surface of a model 1 is profiled or followed by a tracer head 2 in accordance with control of a digitizer 13. A profiled locus is converted to an NC data 14 by the digitizer 13 and the data is applied to an NC device 15. Then, a processing device 16 cuts a work 17 into the same shape as that of the model 1. In this profiling process, since the profiling speed is not controlling in accordance with the shape of the model 1 heretofore, a servo system of the NC device 15 can not follow the suddenly changing surface shape of the model 1, and accordingly overcut portions or uncut portions are produced. In order to prevent the overcut portions and the uncut portions heretofore, the processing speed is varied to be reduced to a low speed manually. However, when the processing speed is varied to be reduced to a low speed manually in this way, the processing efficiency is deteriorated.

Generally, a differential transformer is used to detect a displacement of the profiling operation in the profiling machine. However, while the profiling operation with accuracy of one hundredth in the full scale is merely attained in the case of the differential transformer, the above profiling machine attains the profiling operation with high accuracy of the order of several microns. A detection range of displacement in the profiling operation using the differential transformer is maximum $+/-2$ mm or so. However, there is a fear that an overshoot exceeding the detection range of the differential transformer occurs, for example, at a corner where the shape of the model is suddenly changed. When the overshoot occurs, the profiling machine can not be controlled. If a detector for the large scale displacement having a detection range capable of detecting the above overshoot is manufactured, it is very large in structure and expensive. Accordingly, when there occurs the overshoot exceeding the detection range, a manner of stopping the profiling operation of the profiling machine has been taken heretofore.

However, such a control method limits the profiling speed due to the detection range, and accordingly the high speed profiling operation which is desired in recent years can not be attained.

SUMMARY OF THE INVENTION

The present invention has been made in view of the above prior art drawbacks.

(I) An object of the present invention is to provide a profiling control apparatus which can judge whether a jumping phenomenon occurs or not by electrical processing on the basis of the displacement signal of the stylus.

(II) Another object of the present invention is to provide a profiling control apparatus which controls to perform the profiling operation exactly along a surface shape of a model to be profiled.

(III) Still another object of the present invention is to provide a profiling control apparatus which controls a profiling speed or a processing speed to reduce working time.

(IV) A further object of the present invention is to provide a profiling control method capable of controlling a profiling machine operating at a high speed exceeding a detection range for a displacement of the profiling machine without a large and expensive displacement detector so that the profiling operation is attained stably.

In order to achieve the above objects, the profiling control apparatus and method of the present invention are configured as follows:

(I) The profiling control apparatus which detects a displacement of a stylus pressed on a model surface from a tracer head and controls the profiling machine in accordance with the displacement detection signal, is characterized by comprising displacement compounding means for compounding three dimensional displacement signals $\epsilon x$, $\epsilon y$ and $\epsilon z$ to produce a displacement signal $\epsilon(=\sqrt{\epsilon x^2+\epsilon y^2+\epsilon z^2})$, displacement differentiating means for differentiating the displacement signal $\epsilon$ to produce a differentiated value $d^2\epsilon/dt^2$, comparison voltage producing means for producing a comparison voltage Vc corresponding to a maximum acceleration $\beta$max of the pressed stylus which can be produced thereon, and comparison means for comparing the comparison voltage Vc with the differentiated value $d^2\epsilon/dt^2$ to produce a jumping detection signal when $d^2\epsilon/dt^2 = Vc$.

(II) The profiling control apparatus which detects a displacement of a stylus pressed on a model surface from a tracer head and controls the profiling machine in accordance with the displacement detection signal, is characterized by comprising jumping detection means for detecting jumping of the stylus, jumping production memory means for storing a position where the jumping occurs, and profiling movement commanding means for commanding a profiling drive unit so that the stylus is moved along a predetermined profiling path on the basis of a stylus displacement signal produced from the tracer head and so that when the jumping detection means detects the jumping of the stylus, the stylus is once returned to the position where the jumping has occurred to be moved along the predetermined profiling path again and after the stylus has reached a profiling operation termination point the stylus is moved along the identical profiling path again while reducing the profiling speed near the position where the jumping has occurred on the basis of data of the jumping production memory means so that the stylus exactly follows the surface shape of the model.

(III) The profiling control apparatus which detects a displacement of a stylus pressed on a model surface from a tracer head and controls the profiling machine in accordance with the displacement detection signal, is characterized by comprising vector arithmetic means for converting the displacement of the stylus to a velocity signal, present position calculating means for calculating a present position of the stylus in accordance with a present position of the tracer head and the displacement of the stylus, present position storing means for storing an output of the present position calculating means and producing a stored position of a previous path preceding the present position of the stylus, and velocity calculating means for calculating a shape at the preceding stored position of the previous path produced from the present position storing means and calculating a velocity on the basis of sudden variation of the shape so that an established velocity of the vector arithmetic means is controlled in accordance with the velocity.

In operation, premising that the variation of the shape in the current path on the basis of the shape in the previous path is not large, the profiling operation in the current path effectively utilizes the shape of the previous path so that the profiling speed at a place where the shape in the current path is suddenly changed is reduced and the profiling speed at a place except the suddenly changing place in shape is increased.

(IV) The profiling control apparatus which detects a displacement of a stylus pressed on a model surface from a tracer head and controls the profiling machine in accordance with the displacement detection signal, is characterized by comprising a digitizer which samples a shape of the model profiled by the stylus to digitize the sampled shape to thereby obtain an NC dot train data, memory means for storing the NC dot train data obtained by the digitizer, processing speed setting means for producing a previously established processing speed information, override speed producing means for detecting a variation ratio of the shape of the model in accordance with variation of values of the NC dot train data successively read out from the memory means to calculate an override speed inversely proportional to the variation ratio of the shape and for correcting the established processing speed information in accordance with the override speed to obtain a processing speed information, processing speed information adding means for adding the processing speed information to the NC dot train data successively read out from the memory means, and deriving means for transmitting the NC dot train data with the processing speed information added to an NC machine in accordance with a deriving demand from the NC machine.

(V) The profiling control method including detecting a displacement of a stylus pressed on a model surface from a tracer head and controlling the profiling machine in accordance with the displacement detection signal, is characterized by the provision of holding an excessive displacement detection signal value by an established maximum detection value when the excessive displacement occurs in the profiling machine, controlling the profiling machine in accordance with a previously established signal until the profiling machine is restored to a position corresponding to the maximum detection value, and releasing the hold condition, when the profiling machine is restored to the position corresponding to the maximum detection value, to control the profiling machine by the displacement detection signal again.

The provision of such means can control the profiling machine without stopping the profiling machine even if the profiling operation of the profiling machine exceeds a displacement detection range.

In the present invention, since the above configuration is provided, the following effects can be attained.

(I) The profiling control apparatus of the present invention can determine in accordance with the jumping detection signal whether the stylus can profile the surface shape of the model exactly and is suitable for profiling the model having a suddenly changing surface shape.

(II) Even if the stylus jumps during the profiling operation, the jumping is detected and the stylus is restored on the surface of the model so that the profiling operation can be attained again with accuracy, whereby an exact and high-speed profiling operation along the surface shape of the model can be realized.

(III) Since a suitable profiling speed according to a shape of the model can be automatically obtained if the surface shape of the model is suddenly changed, the profiling operation can be attained with a maximum profiling speed over the whole path to be profiled. Accordingly, the profiling time can be reduced greatly.

(IV) The processing operation can be attained exactly without leaving portion overcut or uncut on a work while holding a high processing efficiency.

(V) The profiling machine can be controlled at a high speed in which the displacement of the profiling machine exceeds the detection range without the provision of a large and expensive displacement detector, and the profiling operation can be attained stably.

BRIEF DESCRIPTION OF THE DRAWINGS

FIGS. 13 to 15 show a third embodiment according to the present invention, in which

FIGS. 20 to 23 show a fifth embodiment of the present invention, in which

DETAIL DESCRIPTION OF PREFERRED EMBODIMENTS

Now, the present invention will be described in a greater detail hereunder with reference to the accompanying drawings which illustrate preferred embodiments thereof.

First Embodiment

The present invention is now described in detail on the basis of a first embodiment. Like elements to those in the above-mentioned prior art are designated by like numerals and description thereof is omitted.

Figure 6:
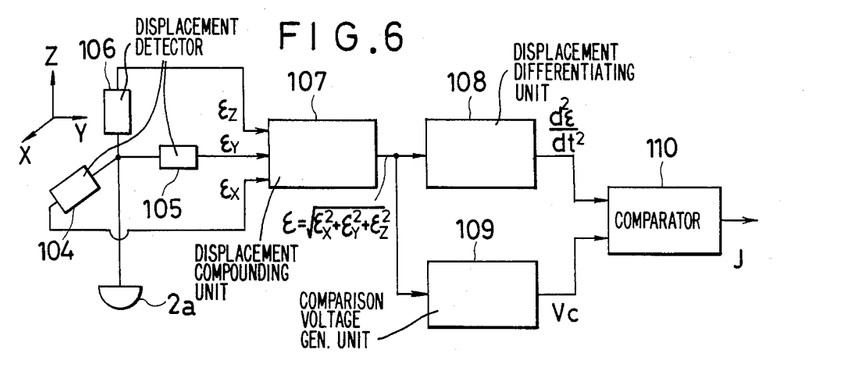
FIG. 6 is a block diagram showing a configuration of a first embodiment according to the present invention.
Figure 7A:
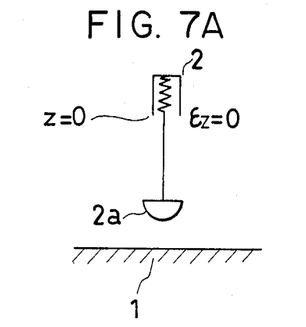
FIG. 7(A) schematically illustrates an intialization.
Figure 7B:
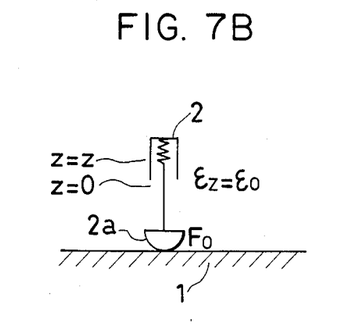
FIG. 7(B) schematically illustrates an profiling operation.

FIGS. 6 and 7 show an embodiment of the present invention. In the embodiment shown in FIGS. 6 and 7, three directions crossing at right angles to each other are X, Y and Z directions and a stylus $2a$ is to be pushed in the direction Z. Displacements x, y and z of the stylus $2a$ in the directions X, Y and Z are detected by displacement detectors 104, 105 and 106, respectively, and three dimensional displacement signals $\epsilon x$, $\epsilon y$ and $\epsilon z$ proportional to the displacements, respectively, are supplied to a displacement compounding unit 107. The displacement compounding unit 107 squares the three dimensional displacement signals $\epsilon x$, $\epsilon y$ and $\epsilon z$, adds the squared values to each other and extracts the square root of the added value so that a displacement signal $\epsilon(=\sqrt{\epsilon x^2 + \epsilon y^2 + \epsilon x^2})$ is calculated. This displacement signal $\epsilon$ is applied to a displacement differentiating unit 108 and a comparison voltage generating unit 109. The displacement differentiating unit 108 differentiates the displacement signal $\epsilon$ twice to calculate the differentiated value $d^2\epsilon/dt^2$. On the other hand, the comparison voltage generating unit 109 calculates a comparison voltage Vc proportional to the displacement signal $\epsilon$. A proporational constant of the displacement signal $\epsilon$ and the comparison voltage Vc is defined so that the comparison voltage Vc corresponds to a maximum acceleration $\beta$max of the pressed stylus $2a$ which can be produed thereon. This is due to the fact that the jumping phenomenon occurs when acceleration $\beta$ of the pressed stylus $2a$ is equal to the maximum acceleration $\beta$max as described later. The differentiated value $d^2\epsilon/dt^2$ and the comparison voltage Vc are applied to the comparator 110, which compares the differentiated value $d^2\epsilon/dt^2$ with the comparison voltage Vc. When the differentiated value $d^2\epsilon/dt^2$ is equal to the comparison voltage Vc, the comparator 110 produces a jumping detection signal J. Thus, it is objectively recognized by the production of the jumping detection signal J that the jumping phenomenon has occurred.

The profiling apparatus constructed above is used as follows. In the first place, when the stylus $2a$ is free in the air without being in contact with a model 1 as shown in FIG. 7(A), an initialization is set so that the displacement z in the direction Z is z=0, that is, the displacement signal ∈z=0. During the profiling operation as shown in FIG. 7(B), the profiling control is performed so that the displacement z in the direction Z is equal to a predetermined target displacement zo, that is, ∈z=∈o. At this time, since the displacements x and y in the directions X and Y are both zero, the displacement signals ∈x and ∈y produced from the detectors 104 and 105 are both zero. Accordingly, the displacement signals ∈ compounded by the displacement compounding unit 107 in the cases of FIGS. 7(A) and (B) are as follows:

In the case of FIG. 7(A):

$$\epsilon = \sqrt{\epsilon x^2 + \epsilon y^2 + \epsilon z^2} = \sqrt{0^2 + 0^2 + 0^2} = 0$$

In the case of FIG. 7(B):

$$\epsilon = \sqrt{\epsilon x^2 + \epsilon y^2 + \epsilon z^2} = \sqrt{0^2 + 0^2 + \epsilon o^2} = \epsilon o$$

Force F pushing the stylus 2a against the model 1 by means of a spring provided in a tracer head 2 in the cases of FIGS. 7(A) and 7(B) is as follows:

In the case of FIG. 7(A): F=0
In the case of FIG. 7(B): F=Fo

Figure 8:
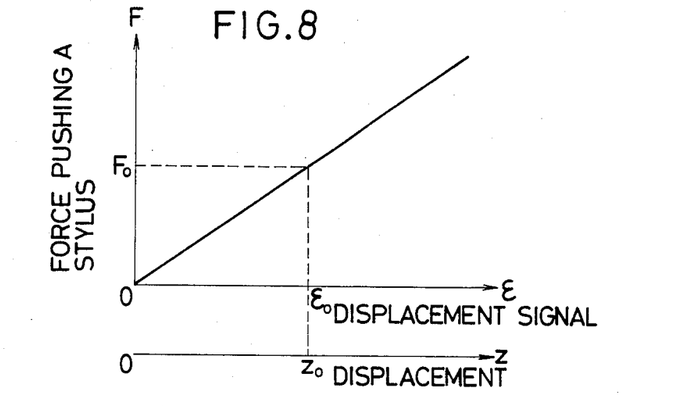
FIG. 8 is a graph showing a relation of force pushing a stylus with regard to displacement and displacement signal.

Summarizing above, it is seen that the displacement z and the displacement signal ∈ of the stylus in the direction Z are proportional to the force F pushing the stylus 2a as shown in FIG. 8. Considering the maximum acceleration βmax of the stylus 2a being able to follow the surface of the model 1, the maximum acceleration βmax is expressed as follows.

$$\beta max = -F/M = -K_1 \cdot z/M = -K_2 \cdot \epsilon /M \quad (1)$$

where M is mass of the stylus, $K_1$ is a spring constant of the spring pushing the stylus, and $K_2$ is a proportional constant.

Figure 9:
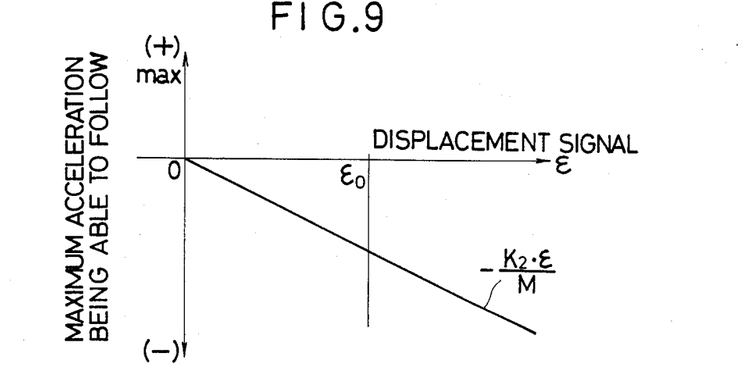
FIG. 9 is a graph showing a relation of maximum followable acceleration to the displacement signal.

As apparent from FIG. 9 representing the relation of the equation (1), the followable maximum acceleration βmax can be calculated as a value proportional to the displacement signal ∈. The jumping phenomenon occurs when the acceleration β coincides with the maximum acceleration βmax, that is, β=βmax in the case where the displacement z of the stylus 2a reduces. The acceleration β of the stylus 2a is expressed by following equation on the basis of the proportional relation of the displacement z and the displacement signal ∈.

$$\beta = d^2z/dt^2 = K_3 \cdot d^2\epsilon/dt^2 \quad (2)$$

where $K_3$ is a proportional constant. Accordingly, the condition β=βmax of producing the jumping phenomenon can be replaced as follows:

β=βmax $$K_3 \cdot d^2\epsilon/dt^2 = -K_2 \cdot \epsilon/M \quad (3)$$

$$d^2\epsilon/dt^2 = -K_2 \cdot \epsilon/(K_3 \cdot M) \quad (4)$$

The differentiated value $d^2\epsilon/dt^2$ is calculated by the displacement differentiating unit 108, and the value $-K_2 \cdot \epsilon/(K_3 \cdot M)$ in the right side is calculated by the comparison voltage producing unit 109 on the basis of previously stored constants $K_2$ and $K_3$, the mass M of the stylus 2a and the displacement ∈ inputted from the displacement compounding unit 107 to obtain a comparison voltage Vc. The differentiating value $d^2\epsilon/dt^2$ and the comparison voltage Vc are compared to each other in the comparator 110. When the differentiating value and the comparison voltage are equal to each other, that is, when the condition of producing the jumping phenomenon as shown in the equation (4) is satisfied, the comparator 110 produces the jumping detection signal J. Since the production of the jumping detection signal J means that the exact profiling operation is not performed, the profiling operation is again performed for the portion where the juping phenomenon has occurred while reducing the profiling speed.

As described above, according to the profiling apparatus of the present invention, the occurrence of the jumping phenomenon can be immediately recognized by the jumping detection signal J. Accordingly, since it can be judged whether the exact profiling operation has been performed or not and the limit of the occurrence of the jumping phenomenon is determined, the profiling speed can be increased as high as possible to reduce the profiling time. In the present embodiment, the comparison voltage Vc is determined on the basis of the mass M of the stylus 2a and the spring constant $K_1$ of the spring pushing the stylus 2a. However, when, for example, another means other than the spring is used as the means for pushing the stylus 2a, the comparison voltage Vc may be determined on the basis of other values corresponding to the spring constant. In any event, the comparison voltage Vc may be a value corresponding to the maximum acceleration βmax of the pressed stylus. The profiling apparatus of the present invention is also applicable to a diesinking machine, a scanning machine, a three-dimensional measuring machine and the like.

Second Embodiment

Figure 10:
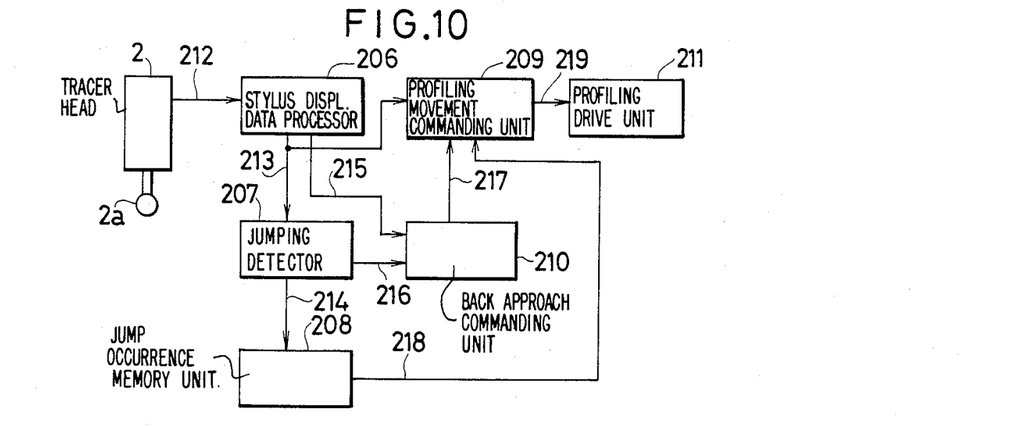
FIG. 10 is a circuit diagram showing a configuration of a second embodiment according to the present invention.
Figure 11:
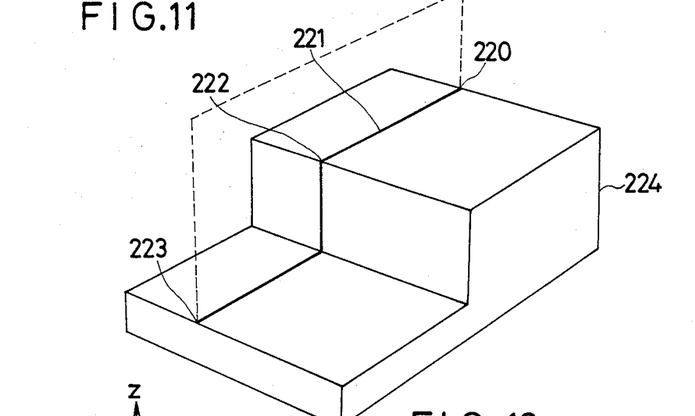
FIG. 11 is a perspective view of a model to be profiled.
Figure 12:
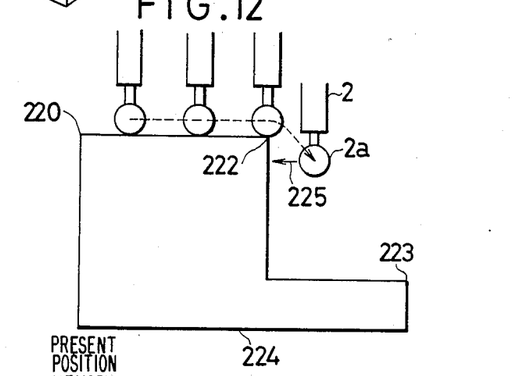
FIG. 12 schematically illustrates the jumping in the profiling operation.

A second embodiment of the profiling control apparatus according to the present invention is now described with reference to the drawings. FIG. 10 is a circuit configuration of an embodiment according to the present invention. FIG. 11 is a perspective view of an example of a model to be profiled in the profiling control apparatus shown in FIG. 10. The profiling control apparatus shown in FIG. 10 begins its profiling operation by moving the stylus 2a attached on the tracer head 2 along a profile path 221 designated on a model 224 as shown in FIG. 11 starting from a position 220. During a normal profiling operation, the tracer head 2 produces a tracer displacement signal 212, which is subjected to a signal processing operation such as, for example, an analog-to-digital conversion in a stylus displacement data processor 206, which supplies a signal 213 to a profiling movement commanding unit 209. The commanding unit 209 supplies a profiling movement command signal 219 to a profiling drive unit 211 on the basis of the stylus displacement data signal 213 so that the stylus 2a is moved along the profile path 221 on the surface of the model 224. The profiling drive unit 211 drives the profiling apparatus equiped with the tracer head 2 to continue the profiling operation on the basis of the profiling drive command signal 219 supplied from the profiling movement commanding unit 209. It is now supposed that the stylus 2a moving at a constant profiling speed can not follow the profile path 221 at a point 222 in which the shape of the profile path 221 is suddenly changed and the stylus 2a jumps from the point as shown in FIG. 12. A jumping detector 207 detects the jumping of the stylus 2a on the basis of the stylus displacement data 213 supplied from the stylus displacement data processor 206 and supplies a jumping detection data 214 to a jump occurrrence memory unit 208. The jumping detection data 214 is, for example, position information of the detected jump point. The occurrence of the jumping can be detected by the fact that the acceleration in the detected displacement of the stylus 2a, for example, is greater than a predetermined value. More particularly, the three-dimensional displacement signal of the stylus 2a is compounded on the basis of the stylus displacement data 213. A differentiated value obtained by differentiating the displacement signal twice by time is compared with, for example, a signal corresponding to the maximum acceleration of the stylus 2a which can be normally produced during the profiling operation to determine the relation as to which of the both is greater or smaller than the other. The jump occurrence memory unit 208 stores the jumping detection data 214, while the jumping detector 207 supplies a stylus return start command signal 216 to a back approach commanding unit 210 after detection of the jumping. The back approach commanding unit 210, in response to the command signal 216, produces to the profiling movement commanding unit 209 a stylus return commanding signal 217 for moving the stylus 2a in the direction opposite to the profiling direction from the present position of the stylus 2a as shown by arrow 225 of FIG. 12. The profiling movement commanding unit 209 applies to the profiling drive unit 211 the movement command signal for returning the stylus 2a so that the profiling apparatus is moved in the direction opposite to the profiling direction. The stylus 2a performs the profiling operation while applying constant pressure against the model 224. Accordingly, if the stylus 2a is moved, after jump, in the direction opposite to the profiling direction in which the profiling operation has been made, the stylus 2a can be certainly returned on the model 224 being profiled. When the stylus 2a is returned on the model 224, the stylus displacement signal is changed and the return of the stylus can be detected. Accordingly, the stylus displacement data processor 206 applies a stylus return stop command signal 215 to the back approach commanding unit 210. The return of the stylus 2a on the model 224 is completed upon the application of the stylus return stop command signal 215. When the stylus 2a is returned on the model 224 after jumping, the profiling operation continues from the return point. When the stylus 2a is moved to a termination point 223 of the designated profiling path 221, the profiling movement commanding unit 209 reads out a jumping memory data 218 from the jump occurrence memory unit 208. If jumping memory data does not exist, the profiling operation along the corresponding profiling path 221 is terminated. If the jumping memory data exists, the profiling movement commanding unit 209 commands the profiling drive unit 211 so that the stylus 2a is returned to the start point 220 of the profiling operation and the profiling operation is performed again. In the case where the profiling operation is performed along the same profiling path 221 again, the profiling speed is drastically reduced near the jumping point 222 detected previously to perform the profiling operation with accuracy. The profiling speed is increased on the profiling path 221 away from the jumping point 222 to reduce the profiling time since the profiling data is obtained from the previous profiling operation.

Third Embodiment

Figure 13:
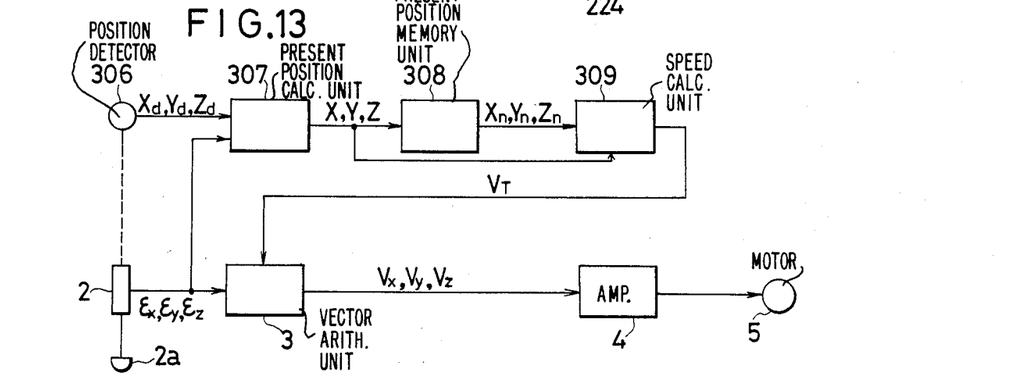
FIG. 13 is a block diagram exemplifying a control apparatus, FIG. 14 schematically illustrates evaluation of an angle in a previous path.

A third embodiment of the present invention is now described with reference to FIGS. 13 to 15. Like elements to those of FIG. 2 are designated by like numerals (the vector arithmetic unit 3, the amplifier 4 and the drive motor 5) and description thereof is omitted. In FIG. 13, numeral 306 denotes a position detector connected to the tracer head 2 for detecting present positions Xd, Yd and Zd of the tracer head 2 in the X-axis, Y-axis and Z-axis and numeral 307 denotes a present position calculating unit responsive to the present positions Xd, Yd and Zd of the tracer head 2 and the displacement signals εx, εy and εz produced from the tracer head 2 which detects a displacement of the stylus 2a being in contact with the model to compound them and calculate the present position X, Y and Z of the stylus 2a. Numeral 308 denotes a present position memory unit for storing the present position X, Y and Z of the stylus 2a supplied from the present position calculating unit 307 and for producing preceding memory position signals Xn, Yn and Zn on the basis of a shape of the previous path preceding the present position X, Y and Z of the stylus and numeral 309 denotes a speed calculating unit responsive to the preceding memory position signals Xn, Yn and Zn in the previous path supplied from the present position memory unit 308 for detecting a suddenly changing portion of the shape in the previous path (for example, a portion of $|\tan \theta| > 1$, described later). When the suddenly changing portion of the shape in the previous path is not detected, the speed calculating unit 309 applies an established maximum speed Vmax to the vector arithmetic unit 3, while when the suddenly changing portion of the shape in the previous path is detected, the speed calculating unit 309 commands the vector arithmetic unit 3 so that the time that a succeeding stylus reaches a point in the present path corresponding to the point in the previous path and returning by a distance corresponding to the degree of the suddenly changing shape is determined from the position signals X, Y and Z produced from the present position calculating unit 307 and the profiling speed is reduced in accordance with the degree of the suddenly changing shape from the reaching point of the succeeding stylus.

Figure 14:
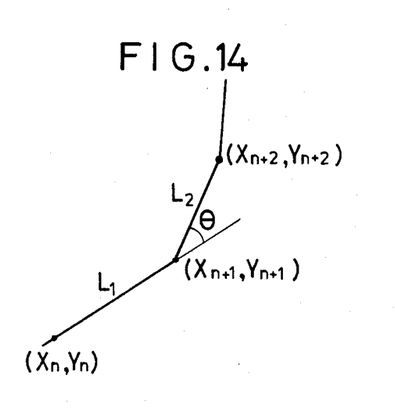
Figure 15:
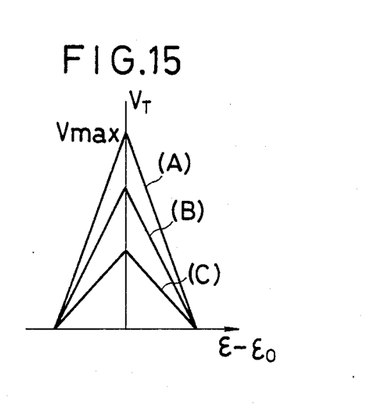
FIG. 15 is a characteristic diagram showing three profiling speeds given to a vector arithmetic unit.

Operation of FIG. 13 is now described in conjunction with FIGS. 14 and 15. The displacement signals εx, εy and εz of the stylus 2a are supplied to the present position calculating unit 307 and the vector arithmetic unit 3 from the tracer head 2. The vector arithmetic unit 3 performs the calculation shown in FIG. 3 to produce velocity components Vx, Vy and Vz. In this case, in order to change the profiling speed $V_T$ established conventionally in the vector arithmetic unit 3, there are provided the present position calculating unit 307, the present position memory unit 308 and the speed calculating unit 309. The present position calculating unit 307 calculates a central position X, Y and Z of the stylus on the basis of the present position Xd, Yd and Zd of the tracer head in X-axis, Y-axis and Z-axis and the displacement signals εx, εy and εz of the stylus from the equations X=Xd+εx, Y=Yd+εy and Z=Zd+εz. The central position signals X, Y and Z of the stylus are stored in the present position memory unit 308 and are supplied to the speed calculating unit 309. The speed calculating unit 309 detects a suddenly changed portion of the shape from the preceding memory position Xn, Yn and Zn in the previous path produced from the present position memory unit 308 on the basis of the position X, Y and Z. The detection is made by evaluating an angle θ formed by two adjacent straight lines $L_1$ and $L_2$ as shown in FIG. 14. In the evaluation, tan θ is obtained on the basis of gradients $m_1$ and $m_2$ of the straight lines $L_1$ and $L_2$.

$$\tan \theta = \frac{m_1 + m_2}{1 + m_1 m_2}$$

It is judged whether the $|\tan \theta| > 1$ or $|\tan \theta| \leq 1$. When $|\tan \theta| \leq 1$, it is determined that there is no sudden variation of the shape and an output operation is made in accordance with the characteristic of the maximum speed Vmax shown in FIG. 15. When $|\tan \theta| > 1$, the profiling operation is returned by a distance proportional to tan θ from the evaluated point (Xn+1, Yn+1 of FIG. 14) of tan θ in the previous path and the profiling speed is reduced so that the reduced speed $V_T$ is $V_T = k \cdot Vmax/|\tan \theta|$ where k is a constant. More particularly, the profiling speed $V_T$ is established in accordance with the characteristic shown by (A) of FIG. 15 when $|\tan \theta| \leq 1$, the characteristic shown by (B) of FIG. 15 when $|\tan \theta| > 1$ but in the vicinity of 1, for example, and the characteristic shown by (C) of FIG. 15 when $|\tan \theta| > 1$ and extremely greater than 1.

Since the detection of $|\tan \theta| > 1$ is performed in the previous path and the returning operation is made in the previous path, when the succeeding stylus arrives in the present path corresponding to the returned point, the actual deceleration is started. In order to detect this arrival, that is, as the condition of starting the deceleration, the present position X, Y and Z of the stylus is supplied to the speed calculating unit 309.

In this manner, while considering the shape of the previous path, when the variation of the shape is small, the stylus is moved at a high speed in accordance with the characteristic (A), and when the shape is suddenly changed, the speed of the stylus is reduced from the position returned by the distance from the changed point. In this case, while the returned distance may be set in accordance with the variation of the shape, the distance may be constant. Further, the degree of the deceleration is calculated in accordance with the variation of the shape.

Fourth Embodiment

Figure 16:
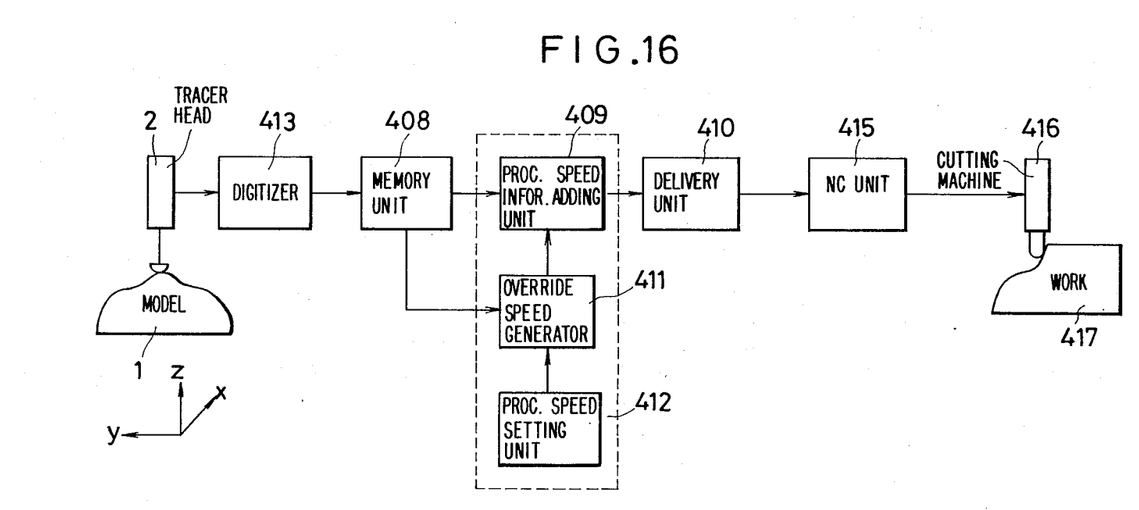
FIG. 16 is a block diagram showing a fourth embodiment of the present invention.

A fourth embodiment of the present invention is now described in detail with reference to the drawings. As described in FIG. 16, the model 1 is profiled by the tracer head 2 and the shape data of the model 1 is sampled and converted to a digitized value in coordinates X, Y and Z as an NC dot train data by a digitizer 413. The digitized NC dot train data is stored in a memory unit 408. Processing speed information is added to the stored NC dot train data in a processing speed information adding unit 409. The added information is transmitted to an NC unit 415 through a delivery unit 410 in response to the delivery demand from the NC unit 415. The NC unit 415 controls a cutting machine 415 in accordance with the transmitted NC dot train data to cut a work 417 to the same shape as that of the model 1. In this case, the processing speed corresponds to the processing speed information. A processing speed setting unit 412 produces a previously determined set processing speed information and supplies it to an override speed generator 411. The override speed generator 411 reads out the NC dot train data from the memory unit 408 and calculates the override speed in accordance with the processing described below. The set processing speed information supplied from the processing speed setting unit 412 is multiplied by the override speed to obtain the processing speed information. The override speed generator 411 transfers the processing speed information to the processing speed information adding unit 409 to add the obtained processing speed to the NC dot train data.

The calculation of the override speed is made as follows.

Figure 17:
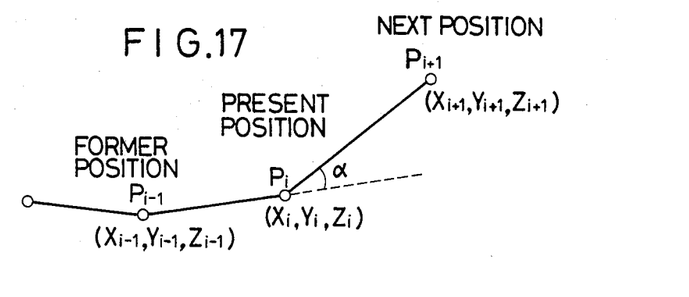
FIG. 17 schematically illustrates a manner of obtaining a variation ratio of a shape on the basis of an NC dot train data.
Figure 18:
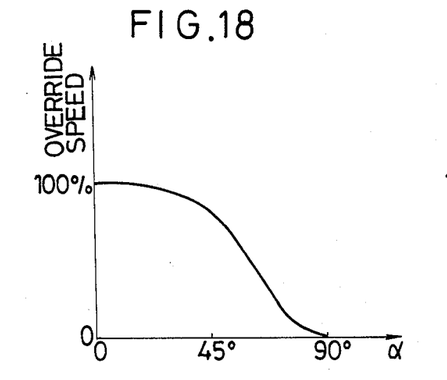
FIGS. 18 and 19 are graphs showing characteristics of override speed to the variation ratio of the shape.
Figure 19:
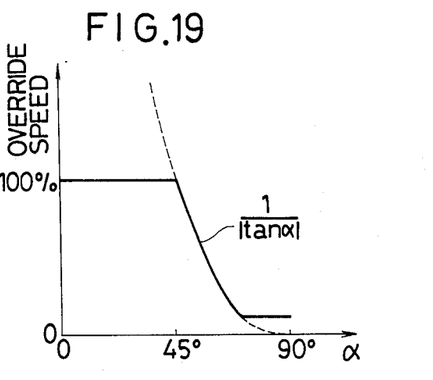

As shown in FIG. 17, the NC dot train data are connected to each other and an angle α formed between a line Pi−1, Pi and a line Pi, Pi+1 is calculated. The angle represents a variation of a next movement to the present movement and when the shape of the model is suddenly changed, the angle α is increased. As shown in FIG. 18 or 19, the override speed which is inversely proportional to the angle α is produced. Accordingly, when the shape of the model is suddenly changed, the angle α is increased and the override speed is decreased whereas when the variation in the shape of the model is small, the angle α becomes small. When the angle α becomes small, the override speed is increased and the processing speed is also increased.

In the above manner, by calculating the override speed in accordance with the shape of the model 1, the processing speed is automatically obtained depending on the shape of the model and hence overcut portion and uncut portion at the portion where the shape thereof is suddenly changed can be eliminated.

Fifth Embodiment

A fifth embodiment of the present invention is now described in detail with reference to the drawings. The embodiment utilizes the characteristic of the profiling operation that when an excessive displacement occurs in the profiling apparatus, a correction operation is performed in a direction opposite to the moving direction of the profiling apparatus so that the profiling apparatus is restored to the position where the excessive displacement has occurred. That is, after an excessive displacement detection signal value has been held by an established maximum detection value upon occurrence of the excessive displacement, the position of the profiling apparatus is monitored and the hold operation is released when the profiling apparatus is restored to the position which has been stored when held. During the hold period, the profiling apparatus is adapted to be controlled by a predetermined signal. When the hold period exceeds a predetermined value, an warning is issued to stop the profiling operation.

Figure 20:
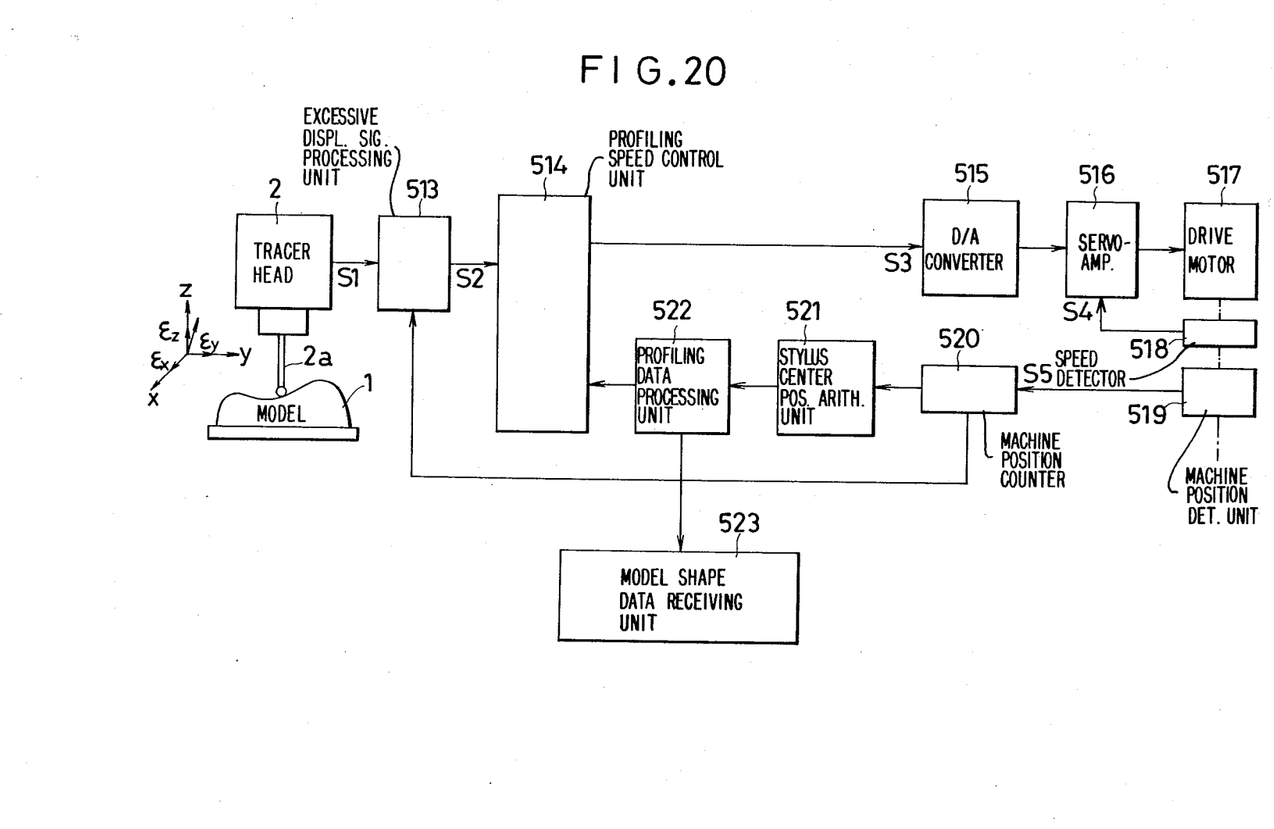
FIG. 20 is a block diagram showing a configuration, FIG. 21 schematically illustrates an excessive displacement produced in the profiling machine.

FIG. 20 is a block diagram showing a configuration of an embodiment for implementing the present invention. In FIG. 20, a tracer head 2 is provided with a stylus 2a which performs the profiling operation for a model 1. A displacement of the tracer head 2 by the stylus 2a is detected as a displacement detection signal S1 for three axes in X-axis, Y-axis and Z-axis direction in a displacement detection unit provided in the tracer head 2. The displacement detection signal is supplied to an excessive displacement signal processing unit 513 which performs a processing operation for the excessive displacement to supply to a profiling speed control unit 514 a displacement processing signal S2. The profiling speed control unit 514 produces a profiling speed command signal S3 on the basis of the displacement processing signal S2. The speed command signal S3 is converted by a D/A converter 515 to an analog signal which is amplified by a servo-amplifier 516. An output signal of the amplifier 516 is supplied to a drive motor 517 for the tracer head 2 to perform the speed control for the drive motor 517.

A speed detector 518 and a machine position detection unit 519 are integrally provided in the drive motor 517. A speed detection signal S4 of the speed detector 518 is fed back to the servo-amplifier 516 to perform constant speed control. A position detection signal S5 of the machine position detection unit 519 is integrated by a machine position counter 520 and the signal integrated by the counter 520 is supplied to a stylus center position arithmetic unit 521 to calculate central position data of the stylus. The integrated signal of the counter 520 is also fed back to the excessive displacement signal processing unit 513 as machine position data for use upon occurrence of excessive displacement. The stylus central position data is processed by a profiling data processing unit 522 to a model shape data, which is supplied to a model shape data receiving unit 523 for a memory medium and a working machine and is supplied to the profiling speed control unit 514.

While the servo-system for only a single axis is shown in FIG. 20, servo-systems for three axes are actually required.

Description is now made to the operation of the embodiment when displacement of the tracer head 2 by the stylus 2a is within a detection range in the displacement detection unit. The displacement detection signal S1 detected by the displacement detection unit passes through the excessive displacement signal processing unit 513 as it is and is supplied to the profiling speed control unit 514 as the displacement processing signal S2. The profiling speed control unit 514 forms a loop including the displacement processing signal S2 and the profiling speed command signal S3 forming an operation signal and produces the profiling speed command signal S3 for controlling speed of the tracer head 2 so that the stylus 2a follows the surface of the model 1 exactly. More particularly, a speed command is applied to the drive motors 517 for the three axes so that a normal vector $\epsilon = \sqrt{\epsilon x^2 + \epsilon y^2 + \epsilon z^2}$ representing the shape of the model 1 obtained from displacements $\epsilon x$, $\epsilon y$ and $\epsilon z$ of the stylus 2a for the three axes is a predetermined value.

The profiling speed command signal S3 produced from the profiling speed control unit 514 is converted by the D/A converter 515 to a voltage signal which is amplified by the servo-amplifier 516 and the amplified signal is supplied to the drive motor 517 to control the motor. At this time, the speed detection signal S4 of the speed detection unit 518 is fed back to the servo-amplifier 516 to control the motor 517 so that the rotational speed of the motor is maintained constant. The machine position detection signal S5 of the machine position detection unit 519 is integrated by the machine position counter 520 and the integrated signal is supplied to the stylus center position arithmetic unit 521, which calculates the central position of the stylus on the basis of the integrated signal and supplies it to the profiling data processing unit 522. This unit 522 processes the central position data to obtain model shape data which is supplied to the model shape data receiving unit 523. Thus, the model shape data receiving unit 523 performs processing operation on the basis of the model shape data.

Figure 21:
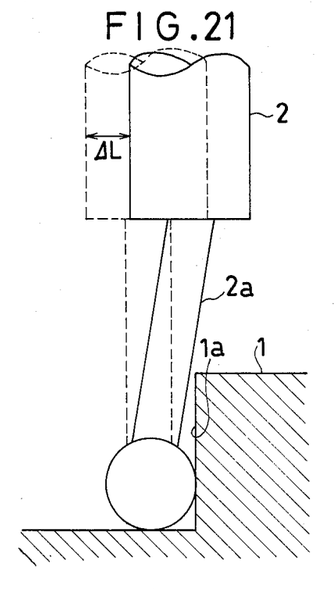
Figure 22:
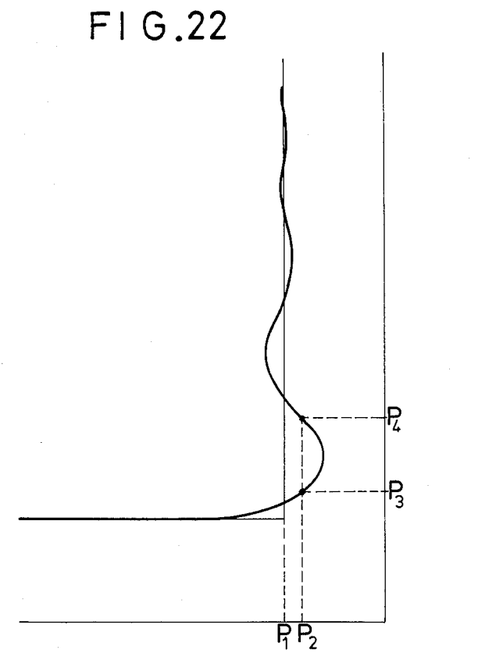
FIG. 22 illustrates an example of a locus of the profiling machine when the excessive displacement is produced.

Description is now made to the case where the stylus 2a impinges against a corner 1a where the shape of the model 1 suddenly changes and the tracer head 2 is moved by excessive displacement ΔL. In this case, even if the tracer head 2 is once moved by the excessive displacement ΔL, correction operation is performed in the direction opposite to the moving direction at that moment. Accordingly, the tracer head 2 is moved to depict a locus shown in FIG. 22. In FIG. 22, P1 represents the stylus central position, P2 represents a maximum value of an effective range of the displacement detection unit, P3 represents a point that the effective range of the displacement detection unit is exceeded and P4 represents a point that displacement is returned to the effective range of the displacement detection unit.

Figure 23:
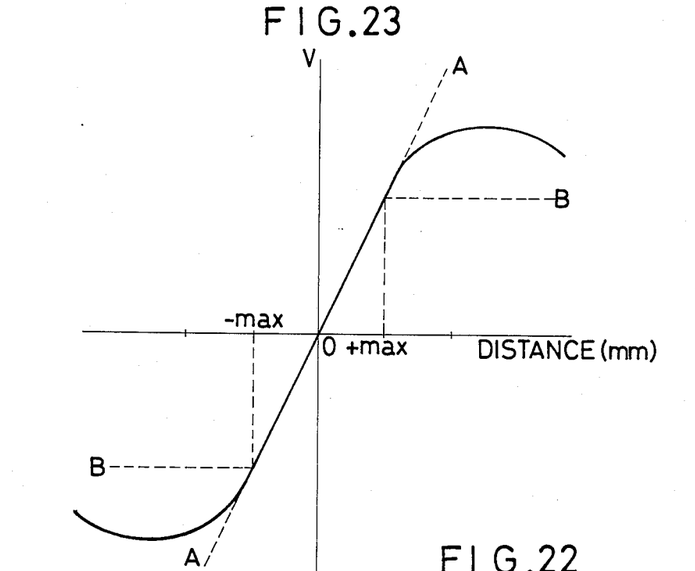
FIG. 23 illustrates an example of a detection characteristic in a displacement detection unit.

On the other hand, the displacement detection unit possesses a characteristic as shown in FIG. 23. That is, it is impossible to detect displacement exceeding the maximum value $+/-$ MAX of the effective range. Accordingly, it is necessary to previously establish a signal as shown by a dash line A proportional to the position of the profiling apparatus or a signal as shown by a dash line B having a saturation characteristic of the MAX point to supply the signal to the profiling speed control unit 514.

When the excessive displacement ΔL has occurred in the tracer head 2, the excessive displacement signal processing unit 513 holds the displacement detection signal value at the time P3 when the tracer head 2 exceeds the detection range and stores an exceeded axis and machine position coordinates of the corresponding axis. A direction and variation with regard to the axis is monitored by a monitor unit (not shown) and the signal value is continuously held until the time P4 of $|\gamma| > |\delta|$ where $\gamma$ is a machine position at the time P3 and $\delta$ is a machine position read out at each subsequent sampling time. During the hold period, the excessive displacement signal processing unit 513 supplies a signal as shown by the dash line A or B of FIG. 23 to the profiling control unit 514 as the displacement processing signal S2. Further, the excessive displacement signal processing unit 513 also monitors the hold time. When the hold time exceeds a predetermined time, a warning signal is issued and at the same time the profiling operation is stopped.

Operation of the profiling speed control unit 514 et seq. is identical with the operation in the case where the displacement of the tracer head 2 is within the detection range in the displacement detection unit and hence description thereof is omitted.

As described above, according to the present embodiment, even if the displacement of the tracer head 2 exceeds the detection range of the displacement detection unit, the tracer head 2 can be controlled by the previously established signals (as shown by the dash line A or B of FIG. 23) produced from the excessive displacement signal processing unit 513. Accordingly, a high speed profiling operation of the tracer head 2 can be attained without using a particularly large and expensive displacement detector.

While the typical preferred embodiments of the present invention has been described fully hereinbefore, it is to be understood that the present invention is not intended to be restricted to the details of the specific constructions shown in the preferred embodiments, but to contrary, many changes and modifications may be made in the foregoing teachings without any restriction thereto and without departing from the spirit and scope of the invention.

We claim:

1. A profiling control apparatus which detects a displacement of a stylus pressed on a model surface from a tracer head and controls a profiling machine in accordance with the displacement detection signal, characterized in that said apparatus comprises displacement compounding means for compounding three dimensional displacement signals $\epsilon x$, $\epsilon y$ and $\epsilon z$ to produce a displacement signal $\epsilon(=\sqrt{\epsilon x^2+\epsilon y^2+\epsilon z^2})$; displacement differentiating means for differentiating the displacement signal $\epsilon$ to produce a differentiated value $d^2\epsilon/dt^2$; comparison voltage producing means for producing a comparison voltage Vc corresponding to a maximum acceleration $\beta$max of the pressed stylus; and comparison means for comparing the comparison voltage Vc with the differentiated value $d^2\epsilon/dt^2$ to produce a jumping detection signal when $d^2\epsilon/dt^2=$Vc.

2. A profiling control apparatus which detects a displacement of a stylus pressed on a model surface from a tracer head and controls a profiling machine in accordance with the displacement detection signal, characterized in that said apparatus comprises vector arithmetic means for converting the displacement of the stylus to a velocity signal; present position calculating means for calculating a present position of the stylus in accordance with a present position of the tracer head and the displacement of the stylus; present position storing means for storing an output of said present position calculating means and producing a stored position of a previous path preceding the present position of the stylus; and velocity calculating means for calculating a shape of the preceding stored position of the previous path produced from said present position storing means and calculating a velocity on the basis of a sudden variation of the shape so that an established velocity of said vector arithmetic means is controlled in accordance with the velocity.

3. A profiling control apparatus which detects a displacement of a stylus pressed on a model surface from a tracer head and controls a profiling machine in accordance with the displacement detection signal, characterized in that said apparatus comprises a digitizer which samples a shape of the model profiled by the stylus to digitize the sample shape thereby producing an NC dot train data; memory means for storing the NC dot train data produced by said digitizer; processing speed setting means for producing a previously established processing speed information; override speed producing means for detecting a variation ratio of the shape of the model in accordance with variation of values of the NC dot train data successively read out from said memory means to calculate an override speed inversely proportional to the variation ratio of the shape and for correcting the established processing speed information in accordance with the override speed to obtain a processing speed information; processing speed information adding means for adding the processing speed information to the NC dot train data successively read out from said memory means; and deriving means for transmitting the NC dot train data with the processing speed information added to an NC machine in accordance with a deriving demand from the NC machine.

4. A profiling control method including the steps of detecting a displacement of a stylus pressed on a model surface from a tracer head and controlling a profiling machine in accordance with the displacement detection signal, said method further comprising the steps:

holding an excessive displacement signal value on the basis of a maximum detection value which is determined by means of an excessive displacement signal processing unit when excessive displacement occurs in the profiling machine, and outputting the thus held value to a profiling speed control unit, while storing machine position data at the occurrence of said excessive displacement;

controlling profiling speed of said profiling machine by means of said profiling speed control unit with reference to the maximum detection value which has been held in that way;

detecting the position of the profiling machine with a machine position detecting unit;

outputting data concerning the position of the profiling machine by integrating the thus obtained position detection signal with a machine position counter; and comparing said position data with the position data stored in the excessive displacement signal processing unit, whereby the profiling machine is controlled again in accordance with the displacement detection signal by releasing the above-mentioned held state when the profiling machine is restored to the position corresponding to the maximum detection value.

* * * * *